United States Patent [19]
Plunguian et al.

[11] 3,896,060
[45] July 22, 1975

[54] PROCESS FOR FORMING FOAMED UNSATURATED POLYESTER RESIN PRODUCTS WHILE UNDER A PARTIAL VACUUM

[76] Inventors: Mark Plunguian, 461 W. Chestnut Hill Rd., Newark, Del. 19713; Charles E. Cornwell, 7104 Marlan Dr., Alexandria, Va. 22307

[22] Filed: Dec. 9, 1974

[21] Appl. No.: 530,683

Related U.S. Application Data

[63] Continuation-in-part of Ser. No. 449,593, March 11, 1974.

[52] U.S. Cl. ........ 260/2.5 N; 260/2.5 B; 260/2.5 E; 260/40 R; 264/50; 264/DIG. 17

[51] Int. Cl.[2] .......................... C08J 9/14; C08J 9/30

[58] Field of Search ..................... 260/2.5 N; 264/50

[56] References Cited

UNITED STATES PATENTS

| | | | |
|---|---|---|---|
| 2,514,141 | 7/1950 | Phillips | 260/2.5 N |
| 3,227,665 | 1/1966 | Fourcade et al. | 260/2.5 N |

*Primary Examiner*—Morton Foelak

[57] ABSTRACT

Compositions of unsaturated polyester resin solutions formed by dissolving the condensation polymers of unsaturated dicarboxylic acids and dihydric alcohols in ethylenically unsaturated copolymerizable monomers may be foamed to give strong, cured cellular structures by carrying out the copolymerization under subatmospheric pressure at a range of about 180 to 50 Torr in the presence of air cells provided either by aeration of the reaction medium or by the incorporation of porous, air-containing materials.

8 Claims, No Drawings

PROCESS FOR FORMING FOAMED UNSATURATED POLYESTER RESIN PRODUCTS WHILE UNDER A PARTIAL VACUUM

CROSS REFERENCE TO RELATED APPLICATION

This application is a continuation-in-part of our copending application Ser. No. 449,593, filed Mar. 11, 1974.

BACKGROUND OF THE INVENTION

This invention involves the use of unsaturated polyester resin compositions comprising: (a) an unsaturated polyester formed by condensing at least one dicarboxylic acid containing $\alpha,\beta$-ethylenic unsaturation and a dihydric alcohol and (b) and $\alpha,\beta$-ethylenically unsaturated copolymerizable monomer. Examples of ethylenically unsaturated dicarboxylic acids include maleic and fumaric acids. The remainder of the dicarboxylic acids my be either normal saturated aliphatics, such as adipic, succinic, and the like, or aromatic diacids, such as phthalic acids, isophthalic acids, or the like. Illustrative of dihydric alcohols are ethylene glycol, propylene glycol, 1,2-butanediol, and diethylene glycol. Examples of ethylenically unsaturated monomers are styrene, $\alpha$-methyl styrene, chlorostyrene, vinyl toluene, divinyl benzene, diallyl phthalate, and methyl methacrylate.

Such ethylenically unsaturated polyester resin solutions in ethylenically unsaturated monomers are very difficult to foam to a cure cellular structure, due to the temperature gelling curve during the copolymerization reaction. After the addition of the catalyst and promoters to effect the copolymerization, the temperature starts to rise very slowly. Then, while still at a relatively low temperature, the resin suddenly gels. The exotherm may eventually reach 300° – 350° F, but by that time the copolymer has reached a rigid structure. Any gas present will be dissipated without expanding the structure. Before reaching the gelling stage, the temperature is too low to effect expansion of the gaseous phase.

SUMMARY OF THE INVENTION

Our application Ser. No. 449,593 describes a process for forming light-weight, strong cellular structures of such copolymerizable resin solutions by carrying out the reaction under a partial vacuum at a range of about 180 to 50 Torr (about 23 to 28 inches of mercury) in the presence of an inert volatile liquid as a blowing agent. It has now been found that another method of achieving such a strong, lightweight cellular structure is to carry out the copolymerization reaction under a similar partial vacuum in the presence of incorporated gaseous cells, or by including porous, air-containing materials in the formulation, to cause foaming of the liquid resin. When a vacuum is pulled on such a copolymerizable reaction medium the incorporated gas causes the whole liquid mass to expand in volume. The amounts of catalyst and promoter have to be controlled so that gelation occurs just after the desired degree of foaming of the liquid mass. If gelation is retarded, the foam may collapse. If the gelation is accelerated, the desired expansion of the volume will not occur.

In general it has been found that the best control is obtained when the vessel containing the reaction medium is evacuated quickly to about 70 Torr (about 27 inches Hg). The vacuum pump is then shut off and the reaction is allowed to proceed to gelling. After the gelation step, it may then be opened to the atmosphere.

The reaction is then completed without any danger of collapsing the structure. The reaction may be carried out in a mold of any design so as to produce a strong, light-weight finished specimen.

Air or other inert gas may be incorporated into the reaction liquid mass by the preferred use of the aerating mixing device described in our copending application Ser. No. 392,643, filed Aug. 29, 1974. It has been found that the incorporated gas may be increased greatly, thus resulting in greatly reduced densities, by the use of special surfactants designed for the reduction of surface tension in organic systems. The following surfactants were found to be applicable for this purpose:

PFA - 1200) block copolymers of a dimethylpolysiloxane and PFA - 1400) polyethylene oxide (General Electric Co.)

DC 193 - Silicone glycol copolymer (Dow Corning Co.)

Zonyl FSA - anionic fluorosurfactant (Du Pont Co.)

Zonyl FSB - amphoteric fluorosurfactant (Du Pont Co.)

Zonyl FSC - cationic fluorosurfactant (Du Pont Co.)

Zonyl FSN - nonionic fluorosurfactant (Du Pont Co.)

The use of such surfactants to reduce the surface tension is believed to stabilize the gaseous cells so that they can survive past the gelation stage. Liquids of higher surface tension are attracted to themselves, thus reducing the total surface. Effective surfactants lower the surface tension, increase the total energy of the system and stabilize the liquid film surfaces around the gaseous cells.

Some of the porous materials that were found to be applicable are powdered perlite and vermiculite. These are the minerals which are exfoliated on heating. Other powdered materials that were effective for this purpose are diatomite, pumice, bentonite, and other inert porous materials of synthetic, biologic, or volcanic origin.

A particularly useful and practical porous material is the ground-up plastic scrap from a previously foamed polymer composition. In casting the specimens in open molds some scrap inevitably accumulates from the operation. This scrap may now be ground to a powder and used in preparing fresh lots of foamed polyester.

Other inert gases besides air may be used under the same conditions to achieve the desired foaming of the reacting mass. Such gases, for example, as nitrogen or carbon dioxide may be used. Air is, of course, the simplest and cheapest gas and does not offer any disadvantage as far as can be determined. We thus wish to include under the term "air" any other inert gaseous material that will serve the same purpose.

Dispersing agents, other surfactants, nucleating agents, cell stabilizers, flame retardants, fillers, and reinforcing agents may be added in preparing the foamed cellular materials.

The use of Wollastonite, the acicular calcium silicate mineral (F-1, Interpace Corp.) was found to be useful as a reinforcing aid. Fumed silica (Cab-O-Sil, Cabot Corp.) may be used to increase the viscosity of the medium and further stabilize the expanded gaseous cell structure prior to gelling. The use of fly ash as filler was found to be an especially desirable additive. This waste product of power plants that are burning powdered coal is a finely divided mineral product high in silica, alumina, and iron oxide. It is inexpensive and can be added in large percentages to the copolyester resins to form compositions of good strength.

The catalyst system can be any compound or mixture of compounds which generate free radicals under the given reaction conditions. These compounds are the peroxides or hydroperoxides, such as diacetyl peroxide, benzoyl peroxide, diethyl peroxide, hydrogen peroxide, methylethyl ketone peroxide, cumene hydroperoxide. Other free radical catalysts may also be used, as for example ammonium persulfates, perborates, and percarbonates. We have used methylethyl ketone peroxide (MEK - P) in our work. Other peroxides or hydroperoxides will work as well.

Also required in conjunction with the free radical catalyst is an accelerator which increases the rate of decomposition of the peroxygen compound, thereby promoting the production of free radicals at a faster rate than can be achieved by the peroxygen compounds alone. This effect in turn greatly accelerates the rate of copolymerization. We have used cobalt naphthenate for this purpose. We have diluted the 12% cobalt naphthenate of commerce to a 3% concentration with styrene for closer control of the copolymerization reaction.

A complexing agent to enhance the effectiveness of the accelerator is also used, such as various amino compounds. These agents are believed to act by reducing the cobaltic naphthenate to the more reactive cobaltous stage. We have used dimethyl aniline (DMA).

In carrying out the reactions, we have mixed the components by mechanical stirring in the following order: polymer solution, surfactant, filler, viscosifier, porous material, peroxide, DMA, and cobalt naphthenate. The order of mixing is not too important as long as the cobalt compound is mixed in last, since this triggers the reaction. Enough cobalt naphthenate is added to allow the transfer of the liquid to the mold, this in turn to the vacuum chamber, and to build up the maximum partial vacuum to achieve the foaming, before gelling occurs.

Expansion of the polymer solution begins at a partial vacuum of about 160 Torr (about 23 inches Hg). The evacuated chamber was closed off when the partial vacuum reached about 70 Torr (about 27 inches Hg). The reaction was allowed to proceed under this vacuum to past the gelling stage. The mold was then removed from the vacuum box and the reaction was completed under atmospheric conditions.

DETAILED DESCRIPTION OF THE INVENTION

The invention will now be described and illustrated by a number of examples. These experiments are summarized in Tables 1 and 2. The resin used for all these experiments was a mixture of 80% of the W. R. Grace Co. rigid unsaturated polyester GR 11015 and 20% of the flexible unsaturated polyester GR 17060. The values given in the table are in parts by weight unless indicated otherwise.

EXAMPLES 1 to 3 (Table 1)

These examples illustrate the effect of processing conditions on the final cured density. The three examples are of an identical composition. Example 1 was mixed by the aerating "vortex" blade of our copending application Ser. No. 392,643. It was allowed to gel and cure under atmospheric pressure, giving the normal unfoamed density of 67 pcf. When an identical sample (Example 3) was placed in a box connected to a vacuum pump, the volume started to expand at a vacuum of about 23 inches of mercury (160 Torr). The vacuum pump was closed off when the vacuum gage reached 27 inches (about 70 Torr) and the volume of the resin solution had expanded to the desired level. The copolymer gelled in about five minutes after the final admixture of the cobalt naphthenate promoter. The specimen was then removed from the vacuum box and was allowed to complete the curing reaction under atmospheric conditions to give the much lower density of 17 pcf. An identical charge (Example 2) was not aerated, but was stirred by hand after each addition of the components. Upon evacuation and completion of the copolymerization reaction, this sample gave the intermediate density of 41 pcf.

EXAMPLES 4 to 6 (Table 1)

Samples 4 and 5 were heavily loaded with fly ash filler. Tween 80 (polyoxymethylene (20) sorbitan monoleate, ICI) was added to No. 4 and the silicone surfactant PFA-1400 to No. 5. Both were aerated equally and exposed to the same vacuum prior to gelling. It is evident that the silicone surfactant much more effectively incorporates and retains the air cells for subsequent expansion. Example No. 6 is another illustration of the effective use of the silicone surfactant.

EXAMPLES 7 to 10 (Table 1)

These examples illustrate the effectiveness of some of the fluorocarbon surfactants in reducing the surface tension of the resin solutions. They thus aid in the incorporation of air cells during aeration and the subsequent expansion of the resin volume in the evacuated atmosphere prior to gelling. These surfactants are especially effective as shown by the small percentages required to achieve the stabilization of the air cells.

EXAMPLES 11 to 22 (Table 2)

The alternate manner of introducing air into the resin system is by the use of porous, air-containing powdered materials. When such filled systems are evacuated prior to gelling, the liquid volume is expanded by the release of the entrapped air in the porous material. The volume is fixed in this expanded foamed structure during gelling thus giving cured strong resins of light weight. Examples 21 and 22 (Table 2) illustrate the use for this purpose of ground-up, cured resin material from previously foamed polyester formulations.

Although particular embodiments of the invention have been described above for purposes of illustration, it will be evident to those skilled in the art that numerous variations of the details may be made without departing from the scope and spirit of the appended claims.

TABLE 1

FOAMING OF UNSATURATED POLYESTER RESINS UNDER A PARTIAL VACUUM BY MECHANICAL AERATION

| Example number | 1 | 2 | 3 | 4 | 5 | 6 | 7 | 8 | 9 | 10 |
|---|---|---|---|---|---|---|---|---|---|---|
| 80:20 resin soln. | 13.5 | 13.5 | 13.5 | 20.0 | 20.0 | 20.0 | 20.0 | 20.0 | 20.0 | 20.0 |
| Wollastonite F-1 | 2 | 2 | 2 | 3 | 3 | 3 | 3 | 3 | 3 | 3 |
| Fly ash | — | — | — | 16 | 16 | — | — | — | — | — |
| Cab-O-Sil | 0.4 | 0.4 | 0.4 | — | — | 0.5 | 0.5 | 0.5 | 0.5 | 0.5 |

TABLE 1—Continued

FOAMING OF UNSATURATED POLYESTER RESINS UNDER A PARTIAL VACUUM BY MECHANICAL AERATION

| Example number | 1 | 2 | 3 | 4 | 5 | 6 | 7 | 8 | 9 | 10 |
|---|---|---|---|---|---|---|---|---|---|---|
| Tween 80 | — | — | — | 0.5 | — | — | — | — | — | — |
| PFA-1400 | 0.5 | 0.5 | 0.5 | — | 1.0 | 0.75 | — | — | — | — |
| Zonyl FSA | — | — | — | — | — | — | — | 0.06 | — | — |
| Zonyl FSB | — | — | — | — | — | — | — | — | 0.06 | 0.03 |
| Zonyl FSN | — | — | — | — | — | — | 0.06 | — | — | — |
| MEK-P | 0.15 | 0.15 | 0.15 | 0.15 | 0.15 | 0.15 | 0.15 | 0.15 | 0.15 | 0.15 |
| DMA | 0.05 | 0.05 | 0.05 | 0.05 | 0.05 | 0.05 | 0.05 | 0.05 | 0.05 | 0.05 |
| Co naphthenate | 0.08 | 0.08 | 0.08 | 0.10 | 0.12 | 0.15 | 0.12 | 0.12 | 0.12 | 0.12 |
| Mech. aeration | A | — | A | A | A | A | A | A | A | A |
| Hand stirring | — | H | — | — | — | — | — | — | — | — |
| Partial vacuum | — | V | V | V | V | V | V | V | V | V |
| Atmosph. press. | A | — | — | — | — | — | — | — | — | — |
| Density (pcf.) | 67 | 41 | 17 | 36 | 17.2 | 19.7 | 20.0 | 18.7 | 17.0 | 18.0 |

Table 2

FOAMING OF UNSATURATED POLYESTER RESINS UNDER A PARTIAL VACUUM BY INCLUSION OF POROUS, AIR-CONTAINING MATERIALS

| Example number | 11 | 12 | 13 | 14 | 15 | 16 | 17 | 18 | 19 | 20 | 21 | 22 |
|---|---|---|---|---|---|---|---|---|---|---|---|---|
| 80:20 resin soln. | 13.5 | 13.5 | 13.5 | 13.5 | 13.5 | 28.0 | 28.0 | 28.0 | 26.5 | 26.5 | 28.0 | 26.5 |
| Wollastonite F-1 | 0.5 | 0.5 | 0.5 | 0.5 | 0.5 | 1 | 1 | 1 | 1 | 1 | 1 | 1 |
| Fly ash | — | — | — | — | — | — | — | — | 20 | 20 | — | 20 |
| Cab-O-Sil | 0.13 | 0.13 | 0.13 | 0.13 | 0.13 | 0.13 | 0.13 | 0.13 | 0.13 | — | 0.5 | — |
| Tween 80 | — | — | — | — | — | 0.13 | 0.13 | — | 0.13 | — | — | — |
| Perlite | — | — | 0.25 | 0.5 | — | — | — | — | — | — | — | — |
| Vermiculite | — | — | — | — | 0.25 | — | — | — | — | — | — | — |
| Pumice | 1.5 | 1.5 | — | — | — | 3 | — | — | — | — | — | — |
| Diatomite | — | — | — | — | — | — | 3 | — | — | — | — | — |
| Bentonite | — | — | — | — | — | — | — | 3 | 3 | 3 | — | — |
| Ex. 18 powder | — | — | — | — | — | — | — | — | — | — | 2.5 | — |
| Ex. 19 powder | — | — | — | — | — | — | — | — | — | — | — | 3.0 |
| MEK-P | 0.15 | 0.15 | 0.15 | 0.15 | 0.15 | 0.2 | 0.2 | 0.2 | 0.2 | 0.2 | 0.2 | 0.2 |
| DMA | 0.02 | 0.02 | 0.02 | 0.02 | 0.02 | 0.07 | 0.07 | 0.07 | 0.07 | 0.07 | 0.07 | 0.07 |
| Co naphthenate | 0.05 | 0.05 | 0.05 | 0.05 | 0.05 | 0.10 | 0.12 | 0.12 | 0.10 | 0.10 | 0.10 | 0.10 |
| Mech. aeration | A | A | A | A | A | A | A | A | A | A | A | A |
| Partial vacuum | — | V | V | V | V | V | V | V | V | V | V | V |
| Atmosph. press | A | — | — | — | — | — | — | — | — | — | — | — |
| Density (pcf.) | 70.5 | 18.0 | 17.5 | 16.5 | 17.5 | 18.0 | 21.0 | 13.5 | 17.5 | 18.3 | 25.0 | 23.5 |

What is claimed is:

1. A process for producing a cured cellular structure which process comprising mixing (a) an unsaturated polyester formed by condensing at least one dicarboxylic acid containing $\alpha,\beta$-ethylenic unsaturation with a dihydric alcohol, with (b) an $\alpha,\beta$-ethylenically unsaturated copolymerizable monomer, and incorporating (c) gaseous cells derived from air into the mixture, foaming this mixture by creating a partial vacuum of 180 to 50 Torr, and effecting the copolymerization of (a) and (b) while under this partial vacuum and while the mixture is in the foamed state.

2. The process according to claim 1 in which the gaseous component is air.

3. The process according to claim 1 in which the gaseous component is nitrogen.

4. The process according to claim 1 in which a silicone surfactant is used as an aid in stabilizing the gaseous component incorporated into the copolymerizable system.

5. The process according to claim 1 in which a fluorocarbon surfactant is used as an aid in stabilizing the gaseous component incorporated into the copolymerization system.

6. The process according to claim 1 in which a porous, air-containing powdered material is used as the means of introducing gaseous cells into the resin system.

7. The process according to claim 1 in which the incorporated air cells are in the form of powdered cured foamed polyester material.

8. The process according to claim 1 in which fly ash is used as a filler.

* * * * *